(12) United States Patent
Namie et al.

(10) Patent No.: US 10,571,874 B2
(45) Date of Patent: Feb. 25, 2020

(54) CONTROL DEVICE FOR PERFORMING LEARNING CONTROL

(71) Applicant: OMRON Corporation, Kyoto (JP)

(72) Inventors: Masaki Namie, Takatsuki (JP);
Masakazu Komatsu, Otsu (JP);
Mikiko Manabe, Takatsuki (JP)

(73) Assignee: OMRON Corporation, Kyoto (JP)

( * ) Notice: Subject to any disclaimer, the term of this patent is extended or adjusted under 35 U.S.C. 154(b) by 26 days.

(21) Appl. No.: 15/750,828

(22) PCT Filed: Oct. 31, 2016

(86) PCT No.: PCT/JP2016/082294
§ 371 (c)(1),
(2) Date: Feb. 6, 2018

(87) PCT Pub. No.: WO2017/094424
PCT Pub. Date: Jun. 8, 2017

(65) Prior Publication Data
US 2018/0231943 A1    Aug. 16, 2018

(30) Foreign Application Priority Data
Nov. 30, 2015   (JP) ................................. 2015-234297

(51) Int. Cl.
*G05B 13/02*   (2006.01)
*G05B 15/02*   (2006.01)
(Continued)

(52) U.S. Cl.
CPC ......... *G05B 15/02* (2013.01); *G05B 13/0265* (2013.01); *G05B 19/19* (2013.01); *G06N 20/00* (2019.01)

(58) Field of Classification Search
CPC ................. G05B 19/404; G05B 19/19; G05B 2219/42129; G05B 2219/42152;
(Continued)

(56) References Cited

U.S. PATENT DOCUMENTS

| | | | | |
|---|---|---|---|---|
| 5,019,763 A | * | 5/1991 | Komatsu | G05B 19/184 318/39 |
| 5,773,938 A | * | 6/1998 | Seong | H02P 23/186 242/334.2 |

(Continued)

FOREIGN PATENT DOCUMENTS

| | | |
|---|---|---|
| JP | S60-057409 | 4/1985 |
| JP | S62-174804 | 7/1987 |

(Continued)

OTHER PUBLICATIONS

"International Search Report (Form PCT/ISA/210) of PCT/JP2016/082294," dated Jan. 10, 2017, with English translation thereof, pp. 1-4.

(Continued)

*Primary Examiner* — Darrin D Dunn
(74) *Attorney, Agent, or Firm* — JCIPRNET

(57) ABSTRACT

A control device (100) for controlling a control subject (2), said control device being equipped with: an instruction value generation part (20) that calculates an instruction value from an instruction pattern; a learning control part (30) that repeatedly calculates correction data containing a correction value for correcting the instruction value calculated from the instruction pattern; and a control part (10) that calculates a corrected instruction value from the instruction value and the correction data, and transmits the corrected instruction value to the control subject. The learning control part (30) generates the correction data from a response delay characteristic of the control subject, and the deviation between a feedback value for the corrected instruction value that has (Continued)

been output for the control subject and the instruction value that has been calculated by the instruction value generation part (20).

7 Claims, 9 Drawing Sheets

(51) Int. Cl.
  *G05B 19/19* (2006.01)
  *G06N 20/00* (2019.01)
(58) Field of Classification Search
  CPC .......... G05B 2219/42128; G05B 2219/42132; G05B 2219/42018; G05B 2219/42151; G06N 20/00; G06N 3/0454; G06N 3/08; B25J 9/163; B25J 9/1641; Y10S 901/02
  See application file for complete search history.

(56) References Cited

U.S. PATENT DOCUMENTS

| | | | | |
|---|---|---|---|---|
| 5,907,450 | A * | 5/1999 | Ishikawa | G11B 5/5547 318/560 |
| 6,107,771 | A * | 8/2000 | Maeda | G05B 19/404 318/600 |
| 6,813,227 | B2 * | 11/2004 | Cho | G11B 7/0953 360/77.04 |
| 6,859,007 | B2 * | 2/2005 | Toyozawa | G05B 19/19 318/609 |
| 6,870,801 | B2 * | 3/2005 | Ikai | G11B 7/0941 369/44.32 |
| 6,950,273 | B2 * | 9/2005 | Nakagawa | G11B 5/59622 360/78.14 |
| 7,042,827 | B2 * | 5/2006 | Cho | G11B 7/0945 369/124.01 |
| 7,085,620 | B2 * | 8/2006 | Maeda | G05B 19/404 173/188 |
| 7,206,659 | B2 * | 4/2007 | Hosokawa | G05B 19/404 700/159 |
| 8,251,484 | B2 * | 8/2012 | Mizes | B41J 3/543 347/19 |
| 8,903,518 | B2 * | 12/2014 | Sonoda | G05B 19/404 318/611 |
| 2001/0043427 | A1 * | 11/2001 | Chen | G11B 5/5521 360/77.04 |
| 2003/0016607 | A1 * | 1/2003 | Cho | G11B 7/0945 369/47.42 |
| 2003/0144764 | A1 * | 7/2003 | Yokono | G06N 3/008 700/245 |
| 2004/0145333 | A1 * | 7/2004 | Toyozawa | G05B 19/19 318/632 |
| 2004/0150363 | A1 * | 8/2004 | Toyozawa | G05B 19/404 318/568.13 |
| 2005/0256605 | A1 * | 11/2005 | Maeda | G05B 19/404 700/193 |
| 2008/0218116 | A1 * | 9/2008 | Maeda | G05B 19/19 318/571 |
| 2010/0295495 | A1 * | 11/2010 | Iwashita | G05B 19/19 318/561 |
| 2016/0033954 | A1 * | 2/2016 | Sonoda | G05B 19/19 318/573 |
| 2018/0335758 | A1 * | 11/2018 | Shinoda | G05B 13/0265 |
| 2019/0028043 | A1 * | 1/2019 | Oho | H02P 6/17 |

FOREIGN PATENT DOCUMENTS

| | | |
|---|---|---|
| JP | S63-204402 | 8/1988 |
| JP | H03-269703 | 12/1991 |
| JP | 2003-308101 | 10/2003 |
| JP | 2004-227163 | 8/2004 |

OTHER PUBLICATIONS

"Written Opinion of the International Searching Authority (Form PCT/ISA/237) of PCT/JP2016/082294," dated Jan. 10, 2017, with English translation thereof, pp. 1-6.
"Office Action of Europe Counterpart Application", dated May 27, 2019, p. 1-p. 5.

* cited by examiner

| | SUM OF SQUARES OF DEVIATIONS | | |
|---|---|---|---|
| | CORRECTION SHIFT TIME [ms] | | |
| NUMBER OF LEARNING TIMES | 1 | 4 | 6 |
| 1 | 325.9367 | 200.8637 | 152.8044 |
| 2 | 152.6261 | 56.4305 | 34.66646 |
| 3 | 75.79733 | 16.45264 | 9.767445 |
| 4 | 44.37652 | 5.101034 | 4.293818 |
| 5 | 36.41889 | 1.893569 | 3.000272 |
| 6 | 43.00389 | 0.96138 | 2.730951 |
| 7 | | 0.676896 | 2.764472 |
| 8 | | 0.582178 | |
| 9 | | 0.543712 | |
| 10 | | 0.526329 | |

FIG. 8

CONTROL DEVICE FOR PERFORMING LEARNING CONTROL

CROSS-REFERENCE TO RELATED APPLICATION

This application is a 371 application of the International PCT application serial no. PCT/JP2016/082294, filed on Oct. 31, 2016, which claims the priority benefit of Japanese application no. 2015-234297, filed on Nov. 30, 2015. The entirety of each of the above-mentioned patent applications is hereby incorporated by reference herein and made a part of this specification.

TECHNICAL FIELD

This invention relates to a control device which controls a control subject using a control instruction through learning control with improved control performance.

BACKGROUND ART

There is a general method of modeling a control subject and calculating a feed-forward input on the basis of a parameter used in identification of a system of the control subject. A learning control method is known as a method in which, when it is difficult for a control subject to precisely calculate a parameter value, a feed-forward input is corrected while trials are actually repeated to realize a target output.

In control of a dynamic system that includes an unknown element as a control subject, learning control is used particularly in control of mechanical systems that use robots and motors.

Patent Literature 1 discloses a numerical control device which takes position deviation data and correction data in each period and performs learning computation using the position deviation data. Accordingly, the numerical control device is disclosed to perform learning control at an arbitrary position at which processing for the same shape is performed, then a position deviation is acquired, and thereby highly precise processing can be realized.

CITATION LIST

Patent Literature

Patent Literature 1: Japanese Unexamined Patent Application Publication No. 2004-227163 (published on Aug. 12, 2004)

SUMMARY OF INVENTION

Problem to be Solved by Invention

However, in order to improve control performance through learning control, it is necessary to appropriately set a parameter to be used in the learning control.

The control device disclosed in Patent Literature 1 described above calculates a correction value that may reduce a target deviation quantity. However, this correction value does not reflect characteristics of the control subject. Thus, there is concern of control performance falling short of a target performance due to a parameter inappropriately set for the learning control. The adjustment of the parameter for learning control and the calculation of the correction value performed while trial and error is performed may hinder a prompt start of a control system including the control device.

The present invention aims to provide a control device that can easily calculate a parameter to be used in learning control suitable for a control subject.

Solution to Problem

To solve the above-described problem, the control device according to the present invention is a control device that controls a control subject and is characterized by including an instruction value generation part that calculates an instruction value from an instruction pattern, a leaning control part that repeatedly calculates correction data including a correction value for correcting the instruction value calculated from the instruction pattern, and a control part that calculates a corrected instruction value from the instruction value and the correction data and transmits the corrected instruction value to the control subject, and the learning control part generates the correction data from a deviation between a feedback value with respect to the corrected instruction value output to the control subject and the instruction value computed by the instruction value generation part and a response delay characteristic of the control subject.

Advantageous Effects of Invention

According to the present invention, a control device that performs learning control which can easily obtain a parameter of a control subject to be used in learning control and improve control performance can be acquired.

BRIEF DESCRIPTION OF DRAWINGS

FIG. 8 is a diagram showing results of learning performed in different correction shift times.

DESCRIPTION OF EMBODIMENTS

An embodiment of a control device 100 according to the present invention will be described below in detail with reference to the drawings. It should be noted that the embodiment does not limit the present invention.

[Embodiment 1]
<Overall Configuration of Control System>

Figure 1:
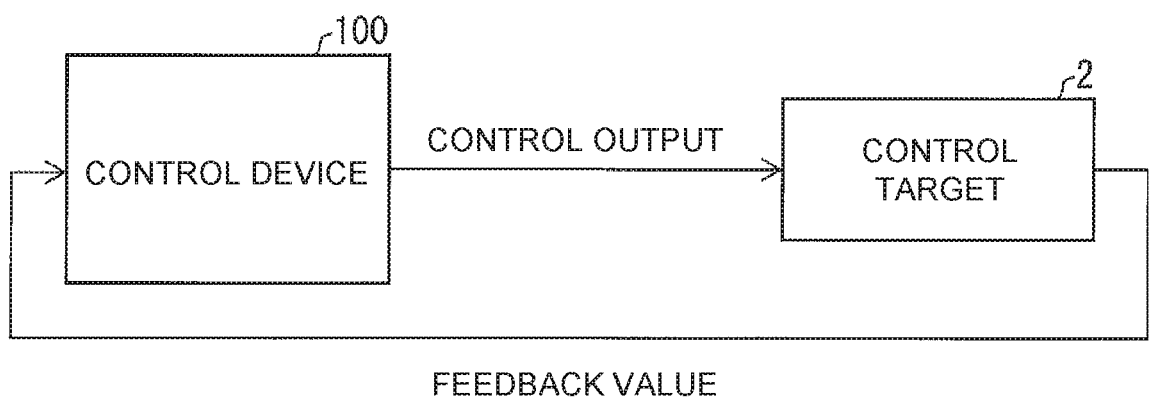
FIG. 1 is a diagram showing an overall configuration of a control system.

FIG. 1 is a block diagram showing a configuration of a control system including the control device 100 according to an embodiment of the present invention. In this drawing, the control system includes the control device 100 according to the present embodiment and a control subject 2. The control device 100 is typically a PLC (programmable logic controller), and computes control outputs to control control subjects. The control device 100 computes a control output from a feedback value that is a result of a control subject controlled in each predetermined control period. The control subject 2 is typically a machine that is driven by an actuator serving as a drive control device, is inputted a control output computed by the control device 100, and is driven in accordance with the control output. The control subject driven in accordance with the control output outputs a driving position, speed, and the like to the control device 100 as feedback values via an encoder (not illustrated) and the like.

An example of the control system that controls tracks in accordance with an instruction pattern by performing position control will be described below in the embodiment of the present invention.

Although an example in which a control subject is driven using a motor will be described in the present embodiment, the invention is not limited thereto as long as the control device 100 performs control, and the control subject may be, for example, a temperature control device that controls temperature.

<Hardware Configuration of Control Device>

Figure 2:
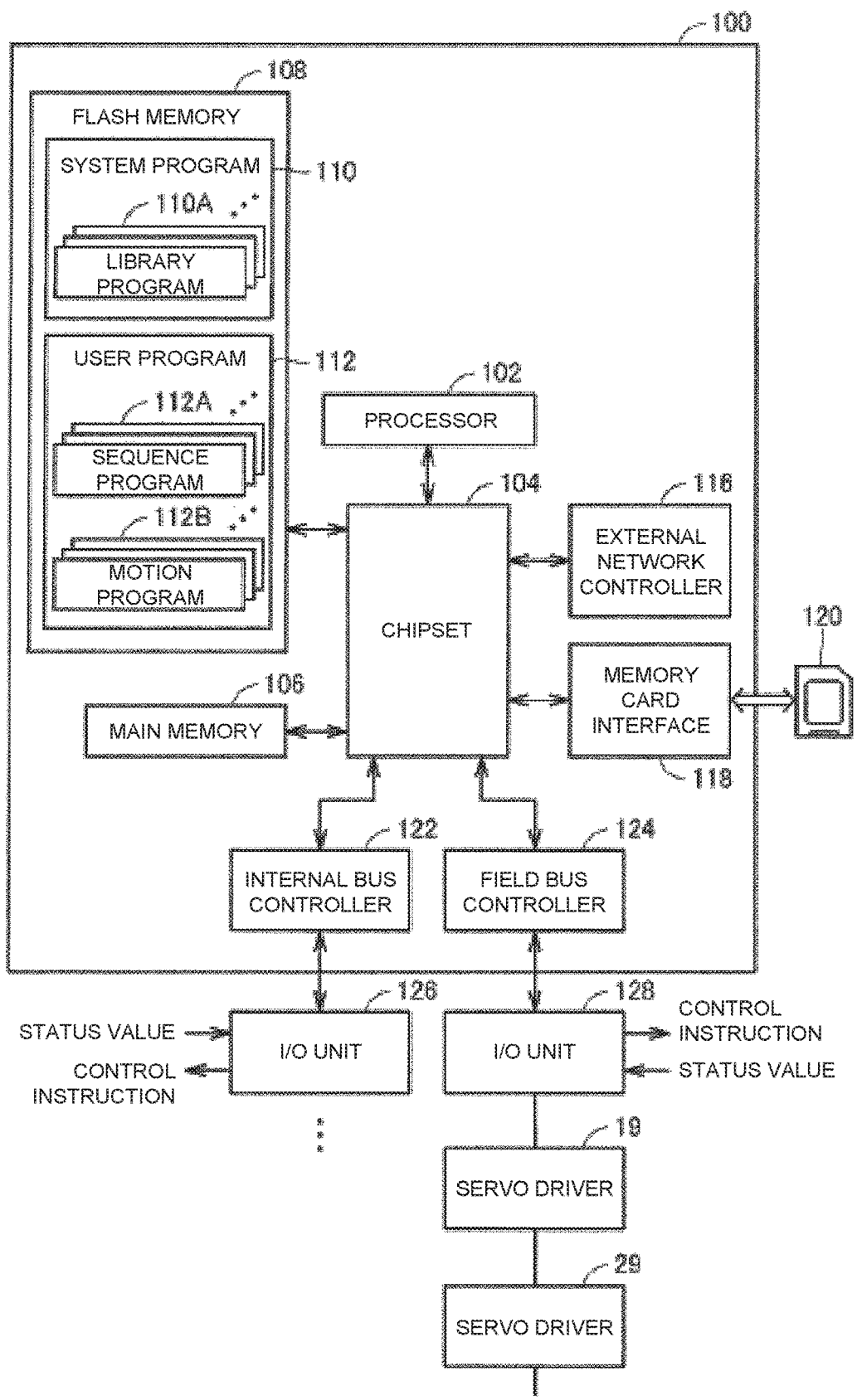
FIG. 2 is a diagram showing a hardware configuration of a control device.

Next, a hardware configuration of the control device 100 will be described. FIG. 2 is a schematic diagram showing an example of a hardware configuration of the control device 100 shown in FIG. 1. Referring to FIG. 2, the control device 100 implements control over a control subject when a processor executes a program installed in advance. More specifically, the control device 100 includes a processor 102 such as a central processing unit (CPU) or a micro-processing unit (MPU), a chipset 104, a main memory 106, a flash memory 108, an external network controller 116, a memory card interface 118, an internal bus controller 122, and a field bus controller 124.

The processor 102 reads a system program 110 and a user program 112 stored in the flash memory 108, develops the programs in the main memory 106 to execute the programs, and thereby realizes control over a control subject. The system program 110 includes instruction codes for providing basic functions of the control device 100, such as data input and output processes or execution timing control. In the present embodiment, the system program 110 includes a library program 110A. The library program 110A is stored by a reusable form in a general processes, and calls (call/invoke) the processes if necessary when the user program 112 is executed. That is, the library program 110A is used in execution of a program of the control device 100.

The user program 112 is arbitrarily designed in accordance with a control subject, and includes a sequence program 112A for executing sequence control and a motion program 112B for executing motion control. The sequence program 112A and the motion program 112B are executed by appropriately calling the library program 110A.

The chipset 104 realizes overall processes of the control device 100 by controlling each of the components.

The internal bus controller 122 is an interface for exchanging data with an I/O unit 126 that is connected to the control device 100 via an internal bus. The field bus controller 124 is an interface for exchanging data with an I/O unit 128 that is connected to the control device 100 via a field bus (FIG. 2). The internal bus controller 122 and the field bus controller 124 acquire status values each input to the corresponding I/O units 126 and 128, and output computation results of the processor 102 as instruction values from each of the corresponding I/O units 126 and 128.

The external network controller 116 controls exchange of data through various types of wired or wireless networks. The memory card interface 118 is designed such that a memory card 120 can be detached therefrom, and data can be written in and read from the memory card 120 therethrough.

Some or all of functions provided when the control device 100 executes programs may be implemented by dedicated hardware circuits.

<Operation of Control Device for Learning Control>

Figure 3:
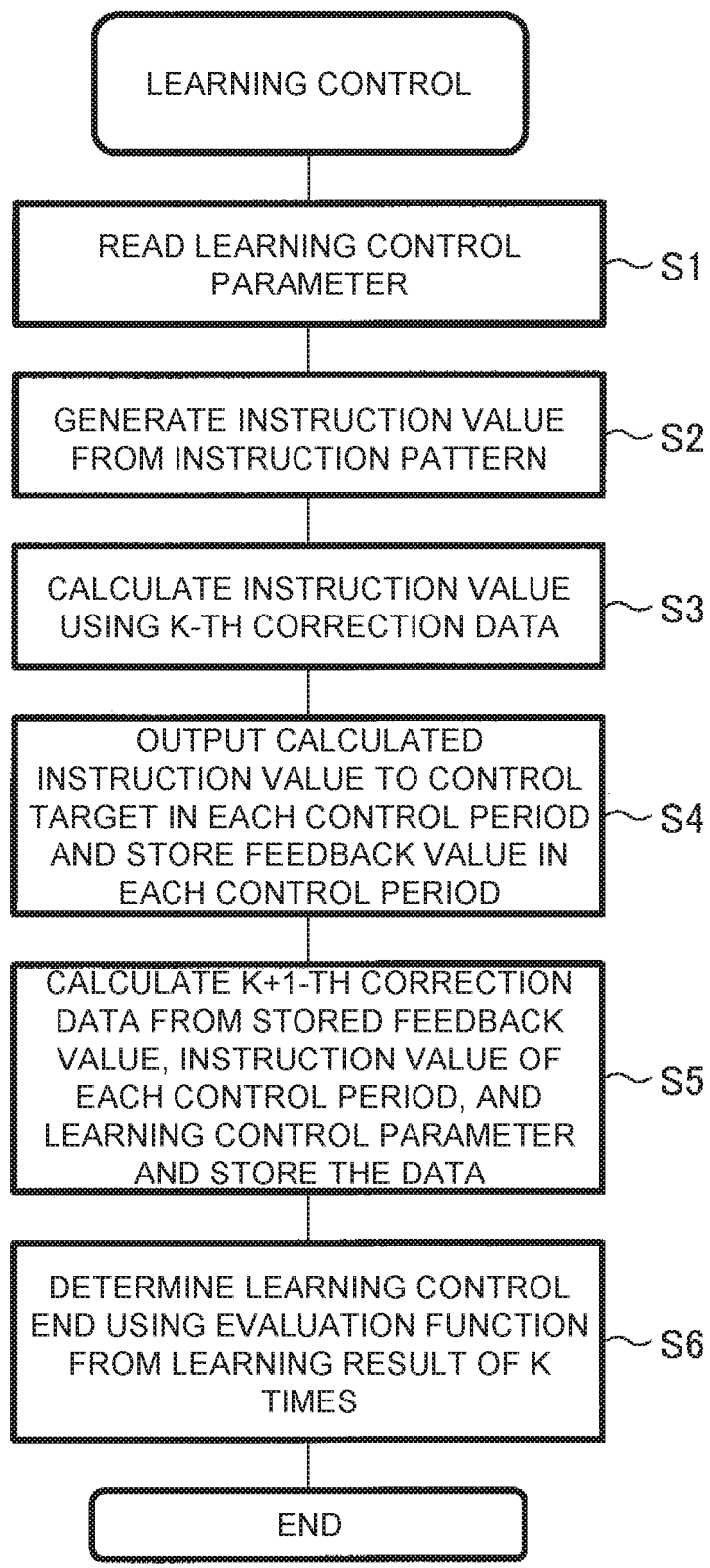
FIG. 3 is a diagram showing a flowchart of an operation of the control device 100.

FIG. 3 shows a flowchart of an operation of the control device 100 when a learning control program according to the present embodiment is executed. When the learning control program is executed, the control device 100 repeatedly calculates correction values for giving desirable outputs using deviation data before a trial.

A learning control parameter is read from a memory in S1. The learning control parameter is a parameter that can be changed in accordance with a characteristic of a control subject controlled by the control device 100, and includes a correction shift time which will be described below.

An instruction value is calculated from an instruction pattern in S2. An instruction value to be output to a motor control device in each control period is calculated from the instruction pattern prescribed in the user program. The instruction pattern is a pattern that defines an operation of a target control subject. The instruction pattern is typically data indicating temporal change in positions of a control subject moving from a specific position to another specific position. The control device 100 calculates a position instruction value from the instruction pattern to be given to the motor control device in each control period.

An instruction value to be output in each control period is calculated using a K-th piece of correction data in S3. The control device 100 reads the correction data stored in the memory, adds the read correction data to the instruction value to correct the instruction value, and thereby obtains a corrected instruction value.

The corrected instruction value that has been corrected in each control period is output to the motor control device in S4. The control device 100 sequentially reads the instruction value corrected in S3 and outputs the corrected instruction value to the motor control device. At the same time, feedback data is acquired from the control subject and sequentially stored in the memory.

A K+1-th piece of correction data is calculated from the stored feedback data, the instruction value of each control period, and the learning control parameter in S5. The control device 100 calculates deviation data of the stored feedback data and the instruction value of each control period, and calculates the K+1-th piece of correction data, using Expression 1 which will be described below, using a correction shift time from the learning control parameter read into the deviation data. By repeatedly executing this series of processes, correction data that is likely to approach an instruction pattern that defines an operation of a target control subject is repeatedly calculated.

In S6, the control device 100 evaluates K pieces of the correction data calculated as results of the learning, and selects and stores most appropriate correction data using a predetermined evaluation function. Specifically, the control device 100 acquires the sum of squares of a $1^{st}$ to a K-th position deviations, and when a decrease rate of the sum of the squares of the position deviations is lower than or equal to a predetermined value, the learning control ends. A method of evaluating learning results is not limited to this technique, and for example, correction data that has a minimum sum of squares of position deviations according to a result of learning performed a predetermined number of times may be selected. In a case in which a level of approach of the correction data to a target value is set as a condition for ending learning control, even if learning control is repeatedly performed and correction data is obtained, the correction data does not necessarily approach a target instruction value, and thus useless learning control computation can be avoided.

<Operation of Control Device when Calculation of Learning Control Parameter is Executed>

Figure 4:
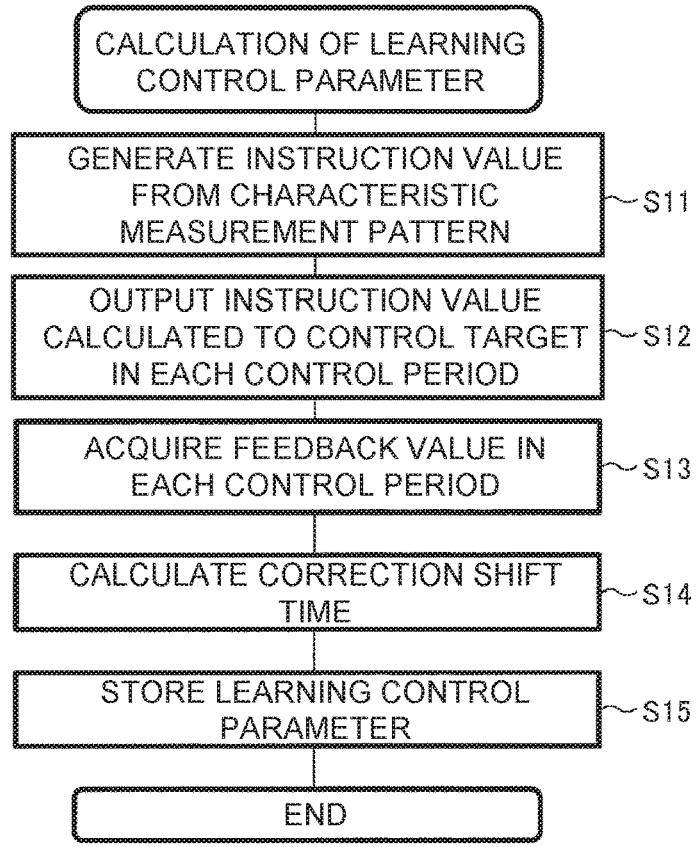
FIG. 4 is a diagram showing a flowchart of an operation of the control device 100.

FIG. 4 shows a flowchart of an operation of the control device 100 when a learning control parameter computation program is executed. When the learning control parameter computation program is executed, the control device 100 calculates a correction shift time included in learning control parameters by acquiring response characteristic data of a control subject device.

When the learning control parameter computation program is executed, the control device 100 reads a characteristic measurement instruction pattern and calculates a characteristic measurement instruction value in S11. Here, the characteristic measurement instruction pattern mentioned may be any instruction pattern as long as it is an instruction pattern in which a response characteristic of a control subject with respect to an instruction value can be calculated, and may be a unit pulse, a step function, or a ramp function.

In S12, the control device 100 outputs the characteristic measurement instruction value calculated in each control period, and takes and stores a feedback value of each control period.

In S13, the control device 100 acquires response characteristic data of the control subject from the characteristic measurement instruction value and the feedback value of each control period. In the embodiment of the present invention, response characteristic data is acquired from the feedback value of a case in which a unit pulse is output. The control device 100 calculates a correction shift time using the response characteristic data. The correction shift time calculated from the response characteristic data will be described below.

The control device 100 calculates the correction shift time and stores the calculated correction shift time as a learning control parameter.

<Operation of Control Device when Control Program Using Learning Result is Executed>

The control device 100 acquires the response characteristic data of the control subject by executing the learning control parameter computation program and stores the learning control parameter as described above.

Figure 5:
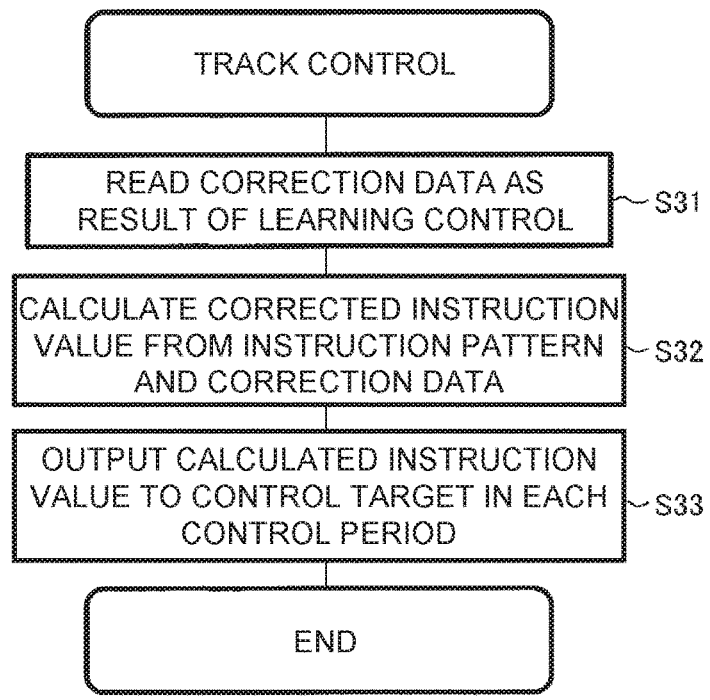
FIG. 5 is a diagram showing a flowchart of an operation of the control device 100.

By executing the learning control program, the control device 100 repeatedly calculates correction data using the calculated learning control parameter from execution of the learning control parameter computation program, and stores the obtained correction data as a result of the learning control (FIG. 5).

The control device 100 calculates an instruction value using an instruction value calculated from the instruction pattern, using the correction data obtained as the result of the learning control, and a correction data obtained as the result of the learning control, and outputs the instruction values in each control period. An instruction value that is likely to make a position deviation have a minimum value with respect to the instruction pattern that is a pattern that defines an operation of the target control subject is calculated using the correction data.

In S31, the control device 100 reads the instruction pattern and generates an instruction value.

In S32, the control device 100 reads the correction data, adds the correction data to the instruction value, and calculates a corrected instruction value.

In S33, the calculated instruction value is output to the motor control device in each control period. The corrected instruction value is repeatedly output to the control subject in each control period.

<Correction Shift Time>

Figure 6:
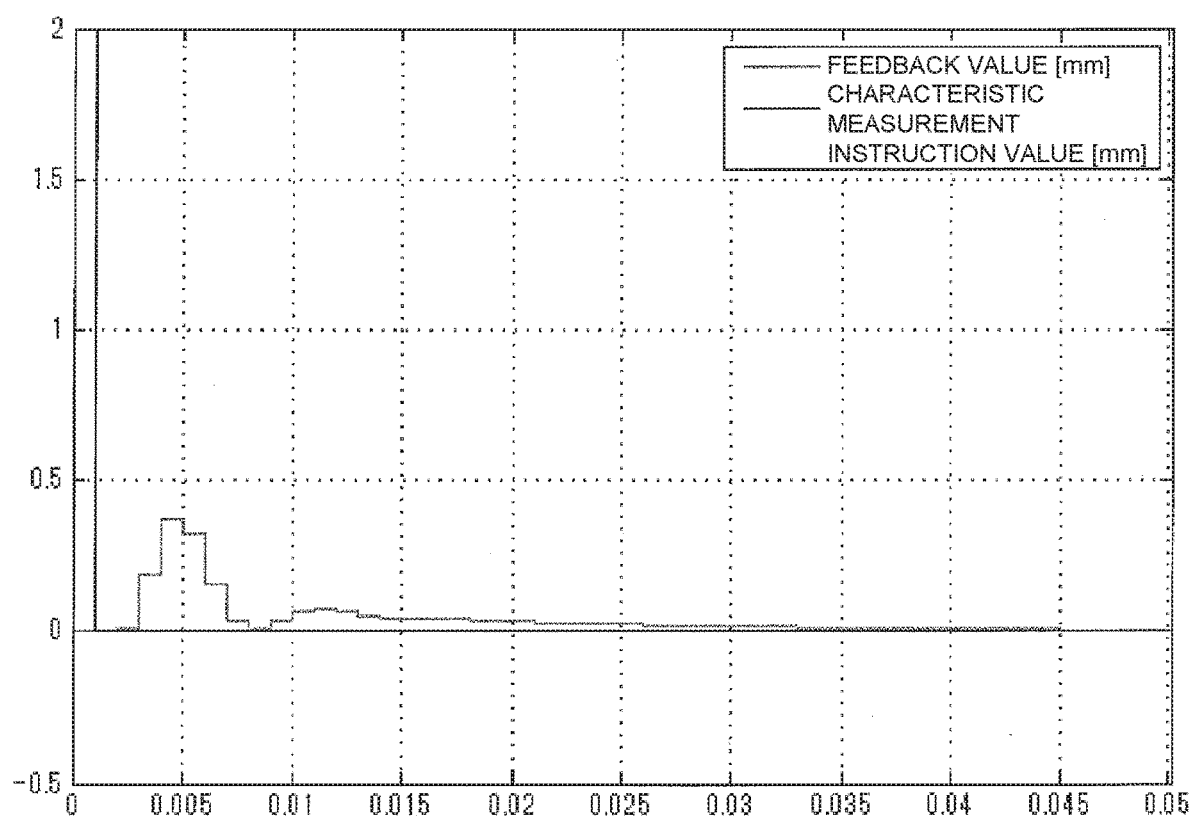
FIG. 6 is a diagram showing calculation of a correction shift time from a characteristic measurement parameter.

FIG. 6 shows an example of a characteristic measurement pattern. Here, an example in which a unit time width pulse (a short pulse of a unit time width) is output as a characteristic measurement pattern is shown. FIG. 6 shows an example in which a unit time width pulse is input and response data thereof is acquired. Here, a unit time refers to a time width of a control period. Since the control period is 1 ms in the example of FIG. 6, the example will be described below on the assumption that a pulse with a width of 1 ms is output.

In a case in which learning control is applied, in general, an instruction value changes at each sampling time. Correction data obtained in learning control is considered as a collection of amounts of corrected sampling times. For this reason, in learning control according to the embodiment of the present invention, a correction amount of an instruction value corresponding to a certain sampling time is obtained using a deviation of the sampling time, and thereby appropriate correction data can be calculated through the learning control.

Since the correction amount of the instruction value is a pulse of each sampling time, when a unit time width pulse is input, the correction amount is obtained from response data of the sampling time that has the most significant influence.

It can be ascertained from the example shown in FIG. 6 that a response delay of 4 ms (a response delay characteristic) occurs in the unit time width pulse. The value thereof is set as a correction shift time.

Figure 7:
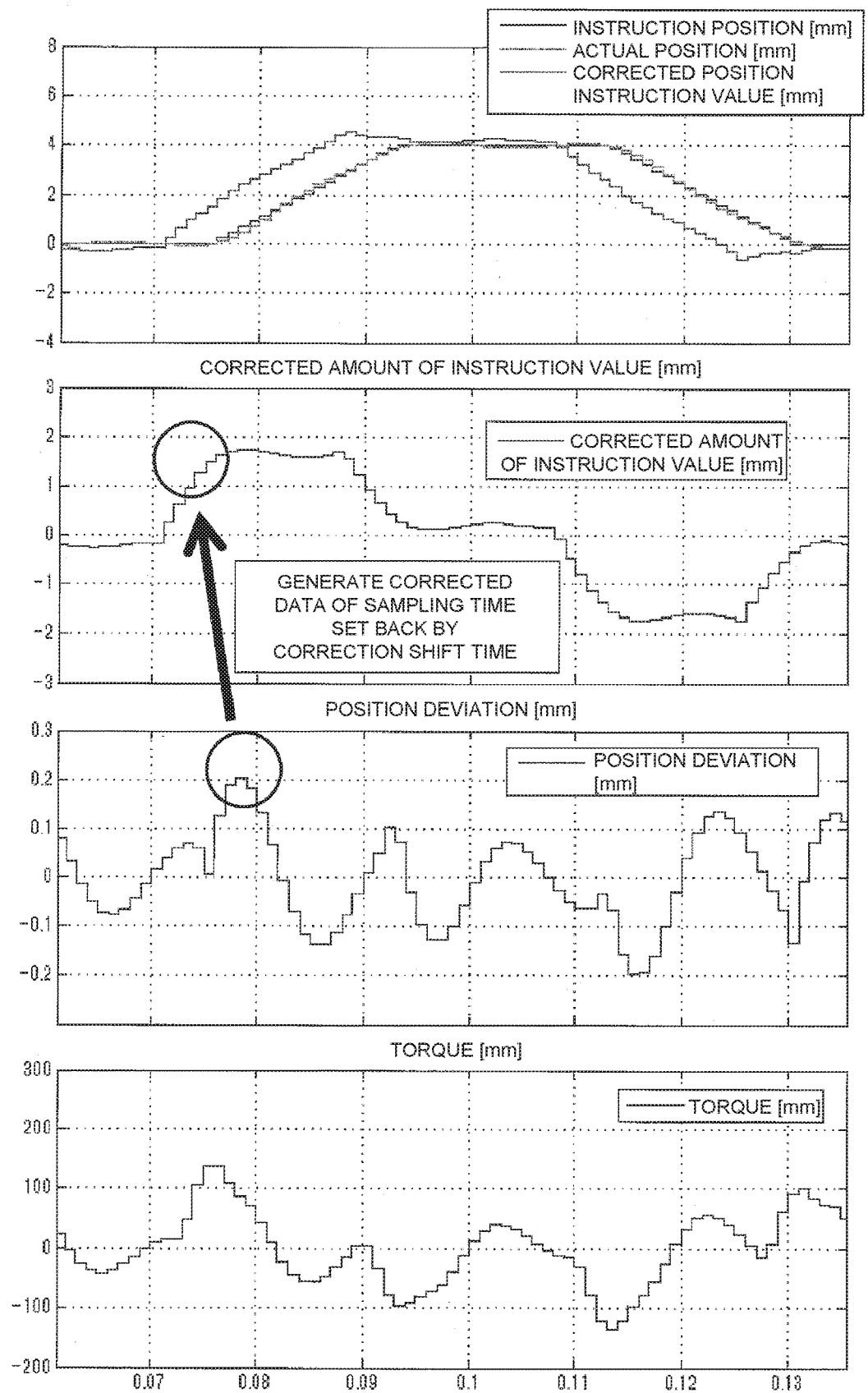
FIG. 7 shows graphs showing results of learning control performed using a learning control parameter.

FIG. 7 shows results of control over corrected instruction values using the correction shift time. Tracks of an instruction position, an actual position, and a corrected position instruction value are shown in FIG. 7. In addition, position deviation amounts of the instruction position and the actual position are shown in FIG. 7. Furthermore, temporal change of a correction amount of an instruction value is shown in FIG. 7. As shown in FIG. 7, it is ascertained with regard to the actual position and the instruction position that the corrected position instruction value causes a deviation between the actual position and the instruction position to be minimized by using correction data of a sampling time set back by the correction shift time.

FIG. 8 shows results of learning control performed on a control subject having the characteristic of FIG. 6 as a response characteristic in different correction shift times. The calculation was performed on the condition that learning control should be terminated in a case in which a decrease rate of the sum of squares of position deviations between a corrected instruction value calculated from the instruction pattern and a feedback value is equal to or lower than 5%.

When a result of learning control performed in a correction shift time set to 4 ms is compared to the results of learning control performed in correction shift times set to 1 ms and 6 ms, it is ascertained that it is hard to approach a target operation even if learning is repeatedly performed when a correction shift time does not have an appropriate value for characteristics of a control subject.

In the present invention, by calculating a correction shift time that is a learning control parameter from a characteristic value of the control subject, learning control is performed in the appropriate correction shift time, and thus it is possible to approach a target operation of a machine defined by the instruction pattern.

<Modified Example of Calculation of Correction Shift Time>

The response data with respect to the unit time width pulse is acquired to calculate a correction shift time in the example of FIG. 6. With regard to this, step response data $S(n)$, in which $n=0$ to $N$, is measured, and then response data $U(n)$ with respect to a unit time width pulse instruction value may be obtained using the following calculation formula.

$$U(n)=S(n)-S(n-1),$$

wherein $n=0$ to $N$, provided that, $S(-1)=0$

In addition, when a correction shift time is calculated, ramp response data $R(n)$, in which $n=0$ to $N$, is measured, and then response data $U(n)$ with respect to a unit time width pulse instruction value may be obtained through step response data $S(n)$ using the following calculation formulae.

$$S(n)=R(n)-R(n-1),$$

wherein $n=0$ to $N$, provided that $R(-1)=0$ $$U(n)=S(n)-S(n-1),$$

wherein $n=0$ to $N$, provided that r $S(-1)=0$

<Functional Configuration of Control Device>

Figure 9:
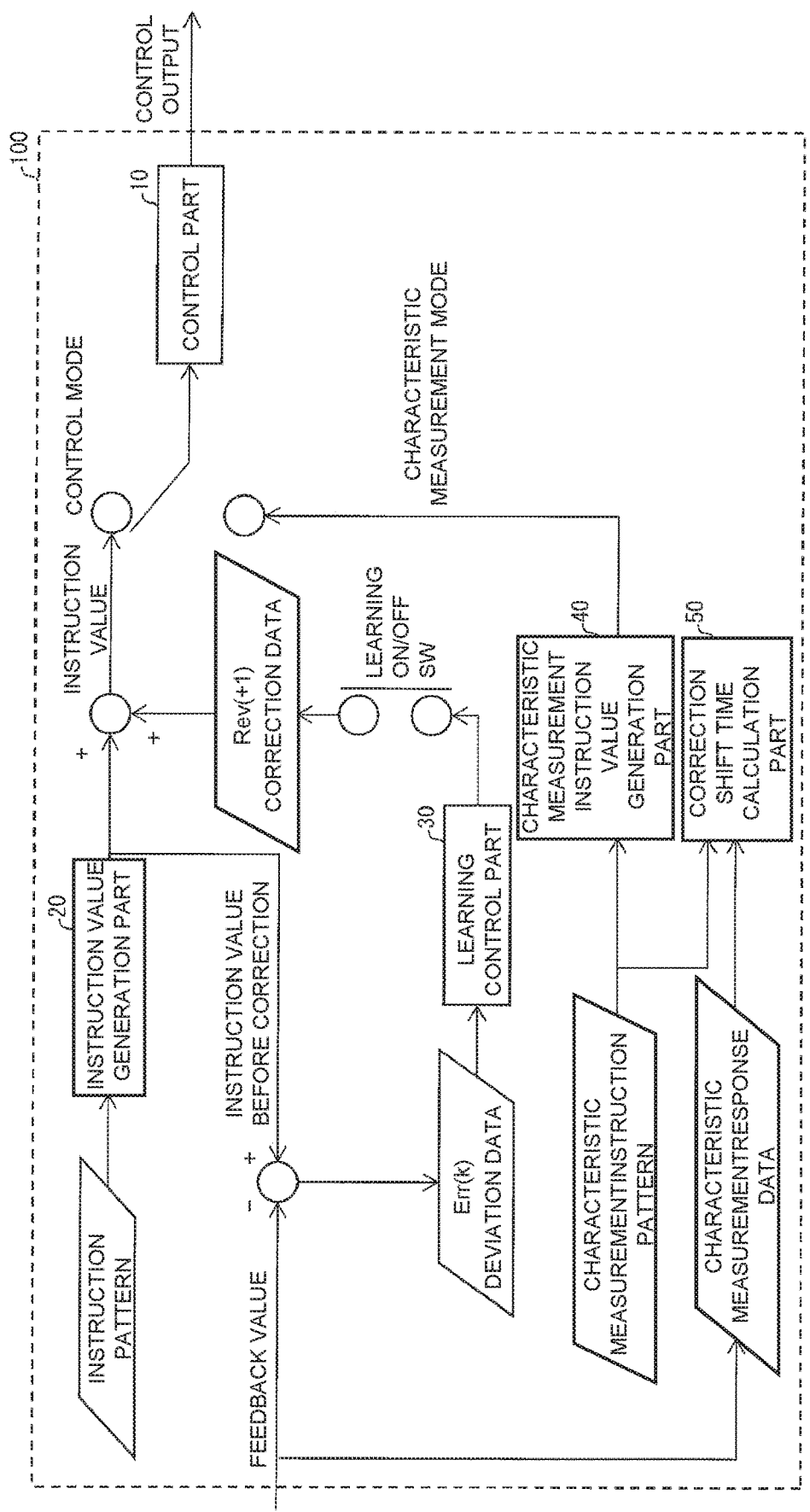
FIG. 9 is a block diagram showing a functional configuration of the control device.

FIG. 9 shows a functional configuration of the control device 100 according to the embodiment of the present invention. The control device 100 includes an instruction value generation part 20, a learning control part 30, a control part 10, a characteristic measurement instruction value generation part 40, and a correction shift time calculation part 50.

The instruction value generation part 20 reads the instruction pattern and generates an instruction value on the basis of the read instruction pattern. Here, the instruction pattern is a target control value to define an operation track of the control subject 2 that the target of the control system.

The control part 10 outputs a corrected instruction value obtained by adding the instruction value generated by the instruction value generation part 20 to correction data generated by the learning control part 30 in each predetermined control period to drive the control subject 2.

The characteristic measurement instruction value generation part 40 generates an instruction pattern for measuring a characteristic of the control subject 2. When measuring a characteristic of the control subject 2, the control part 10 outputs a characteristic measurement instruction value to the control subject 2 in each predetermined control period.

The correction shift time calculation part 50 calculates a correction shift time as a learning control pattern from a feedback value that is obtained from driving of the control subject 2 based on the characteristic measurement instruction value.

The learning control part 30 reads deviation data that is the difference between the instruction value generated by the instruction value generation part 20 and the feedback value, and then repeatedly computes correction data including a correction value to correct the instruction value.

The learning control part 30 computes a deviation between the instruction value computes by the instruction value generation part 20 and the feedback value input from the control subject 2. The learning control part 30 further performs computation using the instruction value computed by the instruction value generation part 20 and the feedback value in each predetermined control period to obtain correction data of a K+1-th instruction value using a K-th deviation data. Here, by computing the correction data using the deviation data obtained by shifting a response characteristic of the control subject 2 by the correction shift time, it is possible to calculate the correction data in accordance with the characteristic of the control subject.

The correction shift time may be a multiple of the control period or a real number.

$$\mathrm{Rev}(k+1)(n)=\mathrm{Rev}(k)(n)+G^*\mathrm{Err}(k)(n+st),$$

wherein k: the number of learning times, $k=0, 1, 2, \ldots$ n: sampling time, $n=0, 1, 2, \ldots$, and N Rev(k+1)(n): correction data at a sampling time n for k+1-th learning time Rev(k)(n): correction data at a sampling time n for k-th learning time G: coefficient for deciding an intensity of learning Err(k)(n+st): deviation data at sampling time n+st for k-th learning time st: correction shift time (an integer multiple of the control period)

The control part 10 adds the instruction value to a correction value and outputs (transmits) the result to the control subject.

<Library Program and User Program>

Next, a configuration in which the control device of the present embodiment performs calculation of a learning control parameter, learning control, and control of an operation track will be described. As an embodiment, the control device is prepared beforehand with the library program that is appropriate for learning control and calculation of a learning control parameter. A user of the control device can generate a code for reading the library program using a support device of the control device, which is not illustrated. If such a library program is provided by the manufacturer of the control device or a third party in advance, it is possible to produce a user program that enables calculation of a learning control parameter suitable for a control subject in a short period of time. That is, the user program is used to compute correction data obtained from an instruction pattern typically in learning control of the control device to control an operation track of a control subject.

Figure 10:
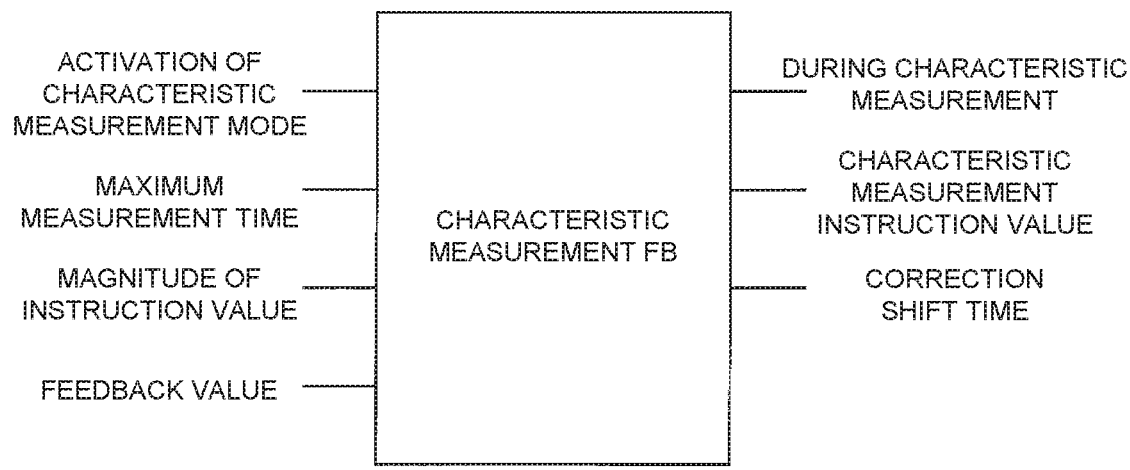
FIG. 10 is a diagram showing an example of a library program executed by the control device according to the embodiment.

FIG. 10 shows an example of a library program executed by the control device according to the present embodiment. The library program mainly includes a learning control function block and a learning control parameter computation function block. Some or all of the function blocks are instructions for assigning reading of a corresponding library program and execution after the reading when the execution order arrives. In other words, a library program that is an actual state of a program corresponding to each function block is prepared beforehand, and a processor appropriately calls and executes the library program in accordance with a program. Functions of each function block will be described below.

A characteristic measurement FB generates an instruction value for computing a response characteristic of a control subject, obtains a feedback value with respect to the generated instruction value, and thereby elicits a correction shift time as a learning control parameter from the response characteristic of the control subject.

Inputs of the characteristic measurement FB is defined that activation of a characteristic measurement mode, a maximum measurement time, an instruction value magnitude and a feedback value. The activation of the characteristic measurement mode is a signal for activating the present function block, and when the signal indicates TRUE, the characteristic measurement mode starts, and TRUE is maintained during measurement of the characteristic. In the characteristic measurement mode, the control device computes the instruction value from the characteristic measurement pattern, outputs the instruction value to the control subject, and sequentially stores the feedback values from the control subject. The maximum measurement time is a maximum time taken to measure the feedback value from the output of the instruction value to the control subject, and the feedback value of the control subject is measured for the maximum time from the control period in which the characteristic measurement instruction value is output and stored. The instruction value magnitude is an input for specifying a magnitude of the characteristic measurement instruction value to be output to the control subject, and the characteristic measurement instruction value having the magnitude of the instruction value for the maximum measurement time is output in a pulse shape or a step shape.

The inputs of the characteristic measurement function block is further defined as a feedback value. For the feedback value, a stored feedback value is input in a measurement time given as the maximum measurement time. A correction shift time is output by comparing a time of the characteristic measurement instruction value with a time of the feedback value.

2. Learning Control Function Block

Figure 11:
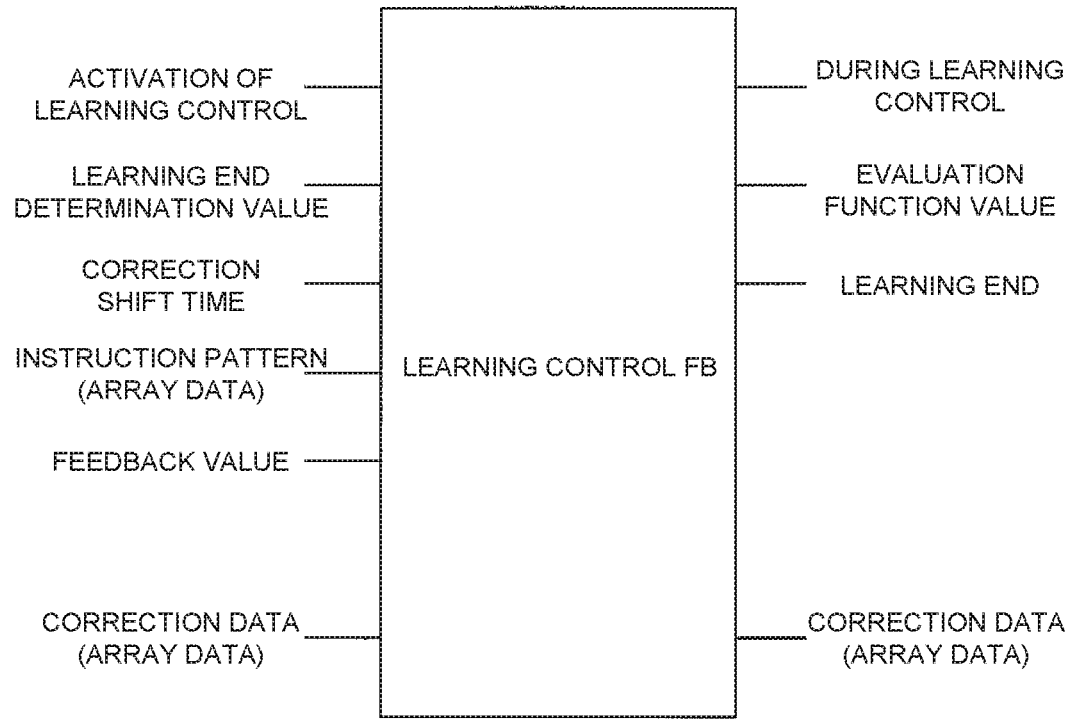
FIG. 11 is a diagram showing an example of the library program executed by the control device according to the embodiment.

FIG. 11 shows an example of the learning control function block. Inputs of the learning control function block is defined as activation of learning control. When the activation of learning control is TRUE, TRUE is output during the learning control.

The inputs of the learning control function block further include a learning end determination value, a correction shift time, an instruction pattern (array data), and a feedback value. The learning end determination value is a real number given as a determination condition. The correction shift time is a value calculated by the characteristic measurement function block, and is an integer multiple of the control period or a real number. The instruction pattern is given as array data. The feedback value is given as array data. The sum of squares of position deviations between the instruction pattern and the feedback value is calculated and output as an evaluation function value.

The inputs of the learning control function block is further defined as correction data. For the correction data, the correction data is outputted by adding a time shifted by the correction shift time to the deviation of the instruction pattern and the feedback value, and correction data array is updated and output. When updating of the correction data array is completed, a learning end indicates TRUE as an output, and thus the activation of the learning control function block ends.

(Effects)

By providing the above-described learning control function block, characteristic measurement function block, and the library program for realizing the blocks, it is possible to calculate a learning control parameter for the characteristic of the control subject and generate the user program for performing learning control.

(Supplement)

In order to solve the above-described problems, the control device according to the present invention is a control device that controls a control subject and is characterized by including an instruction value generation part that calculates an instruction value from an instruction pattern, a leaning control part that repeatedly calculates correction data including a correction value for correcting the instruction value calculated from the instruction pattern, and a control part that calculates a corrected instruction value from the instruction value and the correction data and transmits the corrected instruction value to the control subject, and the learning control part generates the correction data from a deviation between a feedback value with respect to the corrected instruction value output to the control subject and the instruction value computed by the instruction value generation part and a response delay characteristic of the control subject.

In addition, the control device according to the present invention may further include a characteristic measurement instruction value generation part, and a correction shift time calculation part that calculates a correction shift time to be used by the learning control part to perform learning control, and the correction shift time calculation part may acquire a feedback value with respect to a characteristic measurement instruction value generated by the characteristic measurement instruction value generation part and calculate the correction shift time by comparing the characteristic measurement instruction value and the feedback value.

Furthermore, the control device according to the present invention may have the characteristic measurement instruction value that is a short pulse of a part time width.

In addition, the control device according to the present invention may have the characteristic measurement instruction value that is in a step function, and the correction shift time calculation part calculates the correction shift time by calculating a step response.

Furthermore, the control device according to the present invention may have the characteristic measurement instruction value that is in a ramp function, and the correction shift time calculation part calculates the step response from a ramp response and calculate the correction shift time from the step response.

In addition, the control device according to the present invention may have the correction shift time that is a real number calculated from the response delay characteristic of the control subject.

The present invention is not limited to each embodiment described above, and can be variously modified within the scope of the claims, and the technical scope of the present invention also includes an embodiment obtained by appropriately combining another embodiment with each disclosed technical means.

The invention claimed is:

1. A control device that controls a control subject, comprising:
a processor, configured to execute programs to function as
an instruction value generation part, a learning control part, a control part, a characteristic measurement instruction value generation part and a correction shift time calculation part, wherein the instruction value generation part calculates an instruction value from an instruction pattern, wherein the learning control part repeatedly calculates correction data including a correction value for correcting the instruction value calculated from the instruction pattern, wherein the control part calculates a corrected instruction value from the instruction value and the correction data and transmits the corrected instruction value to the control subject, wherein the learning control part generates the correction data from a deviation between a feedback value with respect to the corrected instruction value output to the control subject and the instruction value computed by the instruction value generation part and a correction shift time of the control subject, wherein the characteristic measurement instruction value generation part generates a characteristic measurement instruction value for measuring a response characteristic of the control subject, wherein the correction shift time calculation part calculates the correction shift time to be used by the learning control part to perform learning control, wherein the control part transmits the characteristic measurement instruction value to the control subject in each control period in a characteristic measurement mode, the correction shift time calculation part calculates the correction shift time according to a time difference between a control period in which the characteristic measurement instruction value is started to be transmitted to the control subject and a control period having the feedback value of the highest amplitude acquired from the control subject.

2. The control device according to claim 1, wherein the characteristic measurement instruction value is a short pulse of a unit time width.

3. The control device according to claim 1, wherein the characteristic measurement instruction value is in a step function, and the correction shift time calculation part calculates the correction shift time by calculating a step response.

4. The control device according to claim 1, wherein the characteristic measurement instruction value is in a ramp function, and the correction shift time calculation part calculates the step response from a ramp response and calculates the correction shift time from the step response.

5. The control device according to claim 1, wherein the correction shift time is a real number calculated from a response delay characteristic of the control subject.

6. The control device according to claim 2, wherein the correction shift time is a real number calculated from a response delay characteristic of the control subject.

7. The control device according to claim 3, wherein the correction shift time is a real number calculated from a response delay characteristic of the control subject.

* * * * *